W. P. LOUDON.
STORAGE BATTERY CONSTRUCTION.
APPLICATION FILED APR. 18, 1918.

1,324,426.

Patented Dec. 9, 1919.

WITNESS:
Fay E Bronk.
Ralph Munden

INVENTOR.
Warren P. Loudon.
BY
Raymond H. Van Uost
ATTORNEY.

UNITED STATES PATENT OFFICE.

WARREN P. LOUDON, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STORAGE-BATTERY CONSTRUCTION.

1,324,426.  Specification of Letters Patent.  Patented Dec. 9, 1919.

Application filed April 18, 1918. Serial No. 229,275.

*To all whom it may concern:*

Be it known that I, WARREN P. LOUDON, a citizen of the United States, residing at Niagara Falls, in the county of Niagara and State of New York, have invented new and useful Improvements in Storage-Battery Construction, of which the following is a specification.

The present invention relates to storage battery construction.

More particularly the present invention relates to construction of storage battery cells whereby the conductors may extend from the interior to the exterior of the cell and the escape of electrolyte along said conductors is prevented.

An object of the present invention is to provide a construction of the kind above referred to which will be simpler than the constructions now in use, and which will be cheap to manufacture and effectual in operation.

Further objects will be apparent as the description proceeds.

Referring to the drawings.

Figure 1:
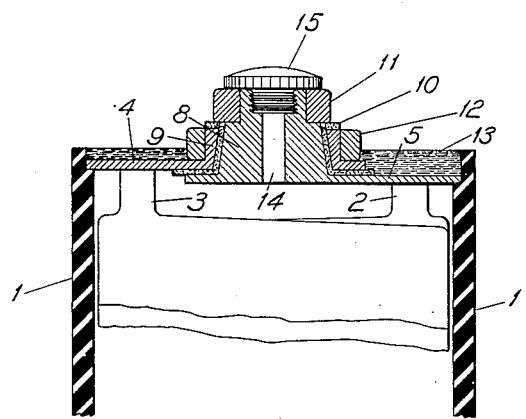
Figure 1 represents in sectional elevation one embodiment of the present invention.
Figure 2:
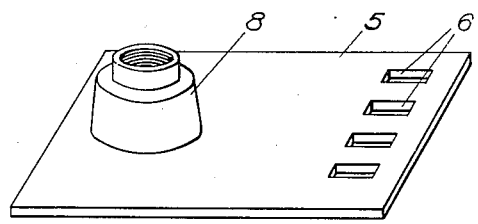
Figs. 2 and 3 represent on an enlarged scale, details of the construction illustrated in Fig. 1.
Figure 3:
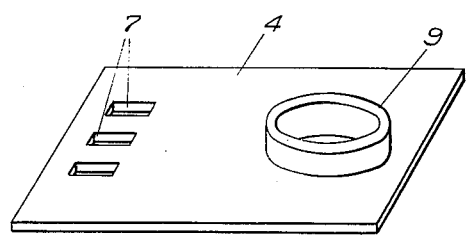

The side walls of a storage battery cell are indicated by the numeral 1. Located within the walls 1 are the battery plates of which those having one polarity are provided with lugs 2, while those of opposite polarity are provided with lugs 3. The cell is closed by a cover which comprises a pair of cover members 4 and 5. The cover member 5 may be directly connected to the lugs 2. For this purpose the cover member 5 may be provided with a plurality of slots 6, 6, into which the lugs 2 may be inserted. The cover member 5 will then be burned to the lugs 2. In Fig. 2 only four slots 6 have been illustrated. It will be understood, of course, that a sufficient number of slots will be provided to accommodate each of the lugs 2. The cover member 4 is similarly united to the lugs 3, said lugs 3 being inserted in slots 7, 7, as ilustrated in Fig. 3.

The cover member 5 is provided with an upstanding boss 8 which should be placed adjacent to one end of the cover member 5. The cover member 5 should be of sufficient length that when the right hand end of said cover member 5 is located in contact with the right hand side wall 1 of the cell, the boss 8 will be located substantially centrally of the cell. The cover member 4 is provided with a hollow boss 9 adapted to surround the boss 8. Suitable insulating material 10 will be provided between the bosses 8 and 9 whereby to effectually insulate the cover member 4 from the cover member 5.

Mounted on the boss 8 is a connecting link or strap 11. Said link should engage with the insulating material 10 and should be of sufficient diameter to hold the boss 9 securely in position. The link 11 should preferably be burned to the boss 8. The boss 9 of the cover member 4 will also be provided with a link 12 which may be burned to said boss 9. It will be evident that the link 11 is electrically connected to the lugs 2 through the cover member 5, while the link 12 is electrically connected through the cover member 4 to the lugs 3. Electrical connection is therefore made from the interior of the cell to the exterior thereof. The space above the cover members 4 and 5 may be filled up with sealing compound 13, whereby the escape of electrolyte between the cover members and the cell walls will be prevented.

The boss 8 which lies within the boss 9 may be provided with a filling aperture 14. A screw-threaded cap 15 may be provided to close the aperture 14 against foreign material, while permitting access to the cell for the purpose of filling or inspecting same. It will be understood, of course, that the cap 15 will be provided with the usual small holes to permit the escape of gases.

It will be evident that the construction illustrated and described provides a sturdy construction which may be readily assembled and disassembled. The two cover members 4 and 5 will be securely held together by means of the link 11 whereby said members will provide all the rigidity of a one-piece cover. Many modifications will occur to those skilled in the art. It is intended in this patent to cover all such modifications that fall within the scope of the invention as defined in the appended claims.

What I claim as new and desire to secure by Letters Patent of the United States, is—

1. In a battery cell, in combination, plates of one polarity, a cover member connected to said plates, plates of opposite polarity, a second cover member connected to said plates of opposite polarity, each of said cover members being provided with an upstanding boss, the boss of one member surrounding the boss of the other member, and insulating material between said cover members.

2. In a battery cell, in combination, plates of one polarity, a cover member connected to said plates, plates of opposite polarity, a second cover member connected to said plates of opposite polarity, each of said cover members being provided with an upstanding boss, the boss of one member surrounding the boss of the other member, and insulating material between said cover members, the inner one of said bosses being provided with a filling aperture.

3. In combination, a battery cell having a cover forming a closure for said cell, said cover comprising a cover member having a boss extending therefrom, a second cover member having a hollow boss extending therefrom, said last mentioned boss surrounding the boss on said first mentioned cover member, and insulating material between said cover members and said bosses.

4. In combination, a battery cell having a cover forming a closure for said cell, said cover comprising a cover member having a boss extending therefrom, a second cover member having a hollow boss extending therefrom, said last mentioned boss surrounding the boss on said first mentioned cover member, and insulating material between said cover members and said bosses, the inner one of said bosses being provided with a filling aperture.

5. In a battery cell, in combination, plates of one polarity, a cover member connected to said plates, plates of opposite polarity, a second cover member connected to said plates of opposite polarity, each of said cover members being provided with an upstanding boss, the boss of one member surrounding the boss of the other member, insulating material between said cover members, and a connecting link connected to one of said bosses and holding said cover members and insulating material in fixed positions relative to one another.

6. In combination, a battery cell having a cover forming a closure for said cell, said cover comprising a cover member having a boss extending therefrom, a second cover member having a hollow boss extending therefrom, said last mentioned boss surrounding the boss on said first mentioned cover member, insulating material between said cover members and said bosses, and a connecting link connected to one of said bosses and holding said cover members and insulating material in fixed positions relative to one another.

7. In a battery cell, in combination, plates of one polarity, each having a lug, a cover member attached to said lugs, plates of the opposite polarity each having a lug, a second cover member attached to the lugs of said latter plates, each of said cover members being provided with an upstanding boss, the boss of one member surrounding the boss of the other member, and insulating material between said cover members.

8. In a battery cell, in combination, plates of one polarity, each having a lug, a cover member attached to said lugs, plates of the opposite polarity each having a lug, a second cover member attached to the lugs of said latter plates, each of said cover members being provided with an upstanding boss, the boss of one member surrounding the boss of the other member, and insulating material between said cover members, the inner one of said bosses being provided with a filling aperture.

9. In a battery cell, in combination, plates of one polarity, each having a lug, a cover member attached to said lugs, plates of the opposite polarity each having a lug, a second cover member attached to the lugs of said latter plates, each of said cover members being provided with an upstanding boss, the boss of one member surrounding the boss of the other member, insulating material between said cover members, and a connecting link connected to one of said bosses and holding said cover members and insulating material in fixed positions relative to one another.

In witness whereof I have hereunto subscribed my name.

WARREN P. LOUDON.